UNITED STATES PATENT OFFICE.

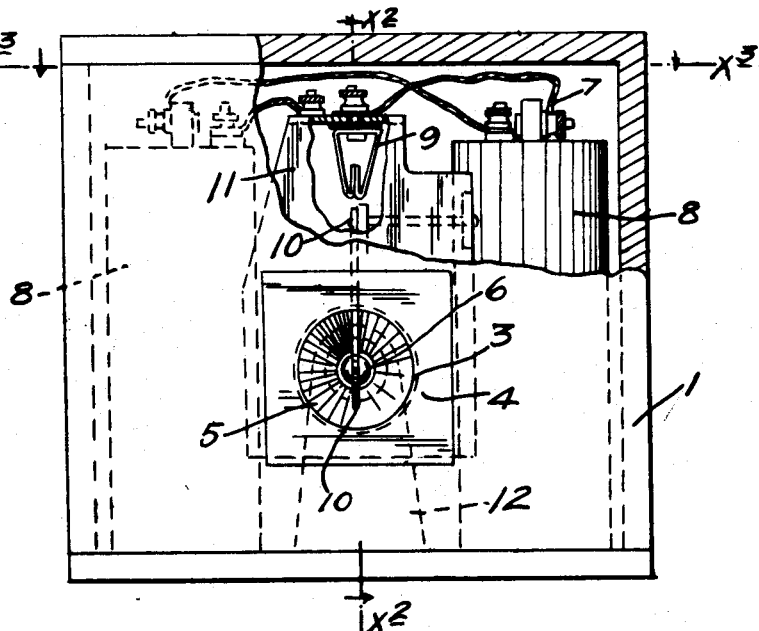
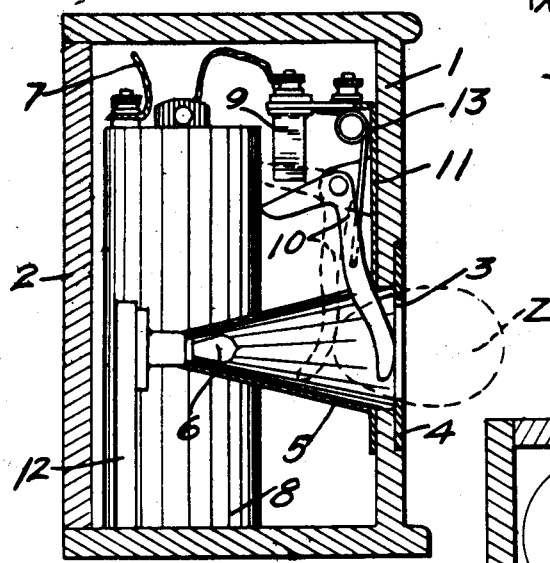
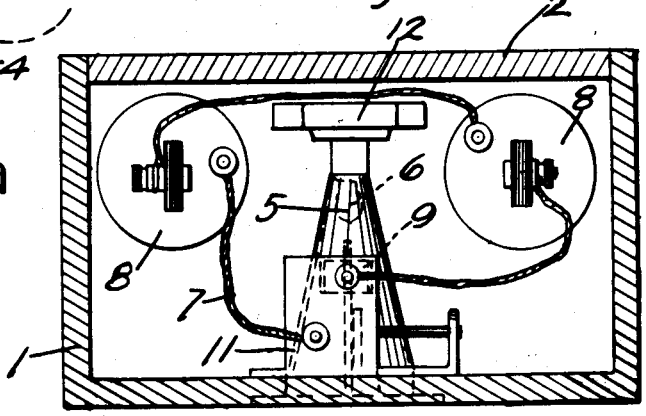

MELVIN P. BAKEN, OF HAYFIELD, MINNESOTA.

EGG-TESTING DEVICE.

1,106,127.  Specification of Letters Patent.  Patented Aug. 4, 1914.

Application filed February 25, 1914. Serial No. 820,847.

*To all whom it may concern:*

Be it known that I, MELVIN P. BAKEN, a citizen of the United States, residing at Hayfield, in the county of Dodge and State of Minnesota, have invented certain new and useful Improvements in Egg-Testing Devices; and I do hereby declare the following to be a full, clear, and exact description of the invention, such as will enable others skilled in the art to which it appertains to make and use the same.

My invention has for its object to provide an improved egg-testing device; and, to this end, it consists of the novel devices and combinations of devices hereinafter described and defined in the claim.

In the accompanying drawings, which illustrate the invention, like characters indicate like parts.

Referring to the drawings, Figure 1 is a front elevation of the improved device, some parts being broken away, and some of the exposed parts being shown in section; Fig. 2 is a view principally in transverse vertical section, taken on the line $x^2$ $x^2$ of Fig. 1; and Fig. 3 is a horizontal section, taken on the line $x^3$ $x^3$ of Fig. 1.

The numeral 1 indicates a rectangular wooden box having a removable back 2, and an annular egg-opening 3 in its front wall. Extending into this opening 3 is a cushioning strip 4 of leather, or other suitable material, against which the egg Z is pressed when inserted into the opening 3. Obviously, this cushioning material will prevent the eggs from being broken when inserted into the opening 3, and it will also yield and closely fit around the egg, so as to exclude all light from the end of the egg projected into the box 1.

Extending from the opening 3 into the box 1 is a horizontal conical casing 5 of thin metal, the large end of which is rigidly secured to the front wall of the box 1. Projecting into the small end of the casing 5 is an electric lamp 6 within an electric circuit 7. Also within the circuit are a pair of dry battery cells 8 and a switch comprising a fixed member 9 and a bell crank 10. This bell crank 10 is pivotally mounted on a bracket 11 of suitable conducting material, and is secured to the front wall of the box 1. The electric lamp 6 is secured to a support 12 extending upward from the box 1. One of the terminals of the circuit 7 is directly connected to the bracket 11, and the other terminal thereof is directly connected to the fixed switch member 9. This switch member 9 is also supported from the bracket 11 but is insulated therefrom. As shown, the fixed switch member 9 is bent from a single piece of spring metal, with its ends in parallel arrangement and normally engaging one another (see Fig. 1). The blade of the switch, or, in other words, the short arm of the bell crank 10, is adapted to be inserted between the ends of the switch member 9, to complete the circuit, as shown by dotted lines in Fig. 2. The long arm of the bell crank 10 extends into the casing 5 into a position to be engaged by the egg Z, and works through a longitudinally extended slot in said casing. A sear spring 13, anchored to the long arm of the bell crank 10 and to the bracket 11, normally holds the short arm of the bell crank 10 in a retracted position, and out of contact with the switch member 9.

From the foregoing description, in connection with the drawings, the operation of the device is thought to be clear. The circuit is normally broken, and when an egg is inserted into the opening 3, the long arm of the bell crank 10 is engaged thereby and moved toward the lamp 6. This movement of the bell crank moves the short arm thereof into contact with the switch member 9, thereby completing the circuit and lighting the lamp, thus enabling the operator to see through the egg. When the egg Z is withdrawn from the opening 3, the spring 13 again returns the bell crank 10 to its normal position, thereby breaking the circuit.

The above device has, in actual usage, proven highly efficient for the purpose had in view.

What I claim is—

An egg-testing device comprising a box having an egg-receiving opening, a tubular casing extending from said egg-receiving opening into said box, and an electric circuit within said box having therein a battery, a lamp, and a switch, said lamp being located at the inner end of said casing, and said switch comprising a stationary member and a spring-retracted bell crank, the short arm of said bell crank affording the movable member of said switch, and the long arm thereof working through an opening in said casing, in a position to be engaged and moved by an egg inserted into the receiving opening in said box, to thereby close said switch.

In testimony whereof I affix my signature in presence of two witnesses.

MELVIN P. BAKEN.

Witnesses:
J. JÖRGEN THOMPSON,
P. M. GLASOE.